United States Patent
Lauch et al.

(10) Patent No.: US 6,805,224 B2
(45) Date of Patent: Oct. 19, 2004

(54) AUTOMATED BRAKE TORQUE MONITORING SYSTEM

(75) Inventors: Richard Lauch, Hopatcong, NJ (US); Roger Frazier, Aspers, PA (US)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 10/331,962

(22) Filed: Dec. 30, 2002

(65) Prior Publication Data

US 2004/0124043 A1 Jul. 1, 2004

(51) Int. Cl.[7] ............................................... F16D 66/00
(52) U.S. Cl. ............................ 188/1.11 E; 188/181 T
(58) Field of Search ....................... 188/1.11 W, 1.11 L, 188/1.11 E, 181 T, 1.11 R; 340/454

(56) References Cited

U.S. PATENT DOCUMENTS

| | | | |
|---|---|---|---|
| 3,244,957 A | * | 4/1966 | Spiess et al. ............... 318/431 |
| 4,474,060 A | * | 10/1984 | Crossman ............... 188/181 T |
| 4,875,558 A | | 10/1989 | Berkhan et al. |
| 5,277,278 A | | 1/1994 | Mehlert et al. |
| 6,217,131 B1 | * | 4/2001 | Schanzenbach ......... 188/181 T |
| 2003/0106369 A1 | * | 6/2003 | Foley et al. ................... 73/121 |

FOREIGN PATENT DOCUMENTS

JP          03106793 A          5/1991

* cited by examiner

Primary Examiner—Thomas Williams
(74) Attorney, Agent, or Firm—Schweitzer Cornman Gross & Bondell LLP

(57) ABSTRACT

An escalator brake torque monitoring apparatus comprises a brake having a brake arm with a mounting point for pivotally affixing the brake to a fixed element of the escalator. A torque sensor is mounted to the brake arm at the mounting point and is affixed to the fixed element. The torque sensor, which may preferably be torque-sensing bolt, generates an output proportional to torque generated by the brake during brake operation. The output of the sensor is compared to at least one reference value corresponding to a minimum acceptable level of torque. In the event the sensed torque is below the minimum, the escalator can be shut down to prevent restart until the failure condition is corrected.

3 Claims, 2 Drawing Sheets

AUTOMATED BRAKE TORQUE MONITORING SYSTEM

The present invention relates to a device for allowing elevator brake torque to be monitored and controlled.

BACKGROUND OF THE INVENTION

The main shafts of escalators and the like, such as moving walkways, are provided with brake systems which, when set, prevent shaft rotation, and thus stop escalator movement. The brake system is set when power to the escalator is shut off. This can be during an emergency condition or when the escalator is otherwise powered down, such as for service. For the brake to function properly, it is imperative that the brake torque or force applied be sufficient to hold the shaft fast and prevent rotation. One way that this can be determined is by setting the brake and then applying a known torque to the set shaft through an electric motor, which is driven by a pwm-controlled source. Such a system is disclosed in published Japanese Application 01244065, published May 7, 1991. Such a system requires a relatively complicated control system for converting the desired torque to the equivalent motor drive input.

Alternatively, the condition of the brake can be checked during an escalator shut-down and maintenance procedure, wherein an appropriate scale is mounted to the brake arm, the brake manually set, and an increasing force or torque applied to the braked component. The application of such a force other than by energizing the shaft drive is often difficult to accomplish. In addition, if the escalator is activated for purposes of applying the force, there is a risk of injury to the maintenance personnel.

It is accordingly a purpose of the present invention to provide an apparatus for monitoring and measuring brake torque, particularly for purposes of insuring that the brake is functioning properly by being capable of withstanding certain minimal torque levels.

A further purpose of the present invention is to provide such a monitoring and measuring apparatus that can continuously monitor applied brake torque whenever the brake is activated.

Yet a further purpose of the present invention is to provide such a monitoring and measuring apparatus with the capability of generating output for a range of operating torques, to permit the determination of potential brake failure before it occurs.

BRIEF DESCRIPTIONS OF THE INVENTION

In accordance with the foregoing and other objects and purposes, an automated brake torque monitoring system constructed in accordance with the present invention comprises a escalator brake having a brake torque arm. A torque sensor in mounted to the brake torque arm in a position such that it is exposed to brake torque during braking operation. The output of the sensor is thus a measure of the braking torque applied. Monitoring means process the output signal, which can be compared to reference values to determine whether the brake is performing in accordance with required specifications.

BRIEF DESCRIPTION OF THE DRAWINGS

A fuller understanding of the present invention will be obtained upon consideration of the following detailed description of a preferred, but nonetheless illustrative embodiment of the invention, when reviewed in association with the annexed drawings, wherein.

DETAILED DESCRIPTION OF THE INVENTION

Figure 1:
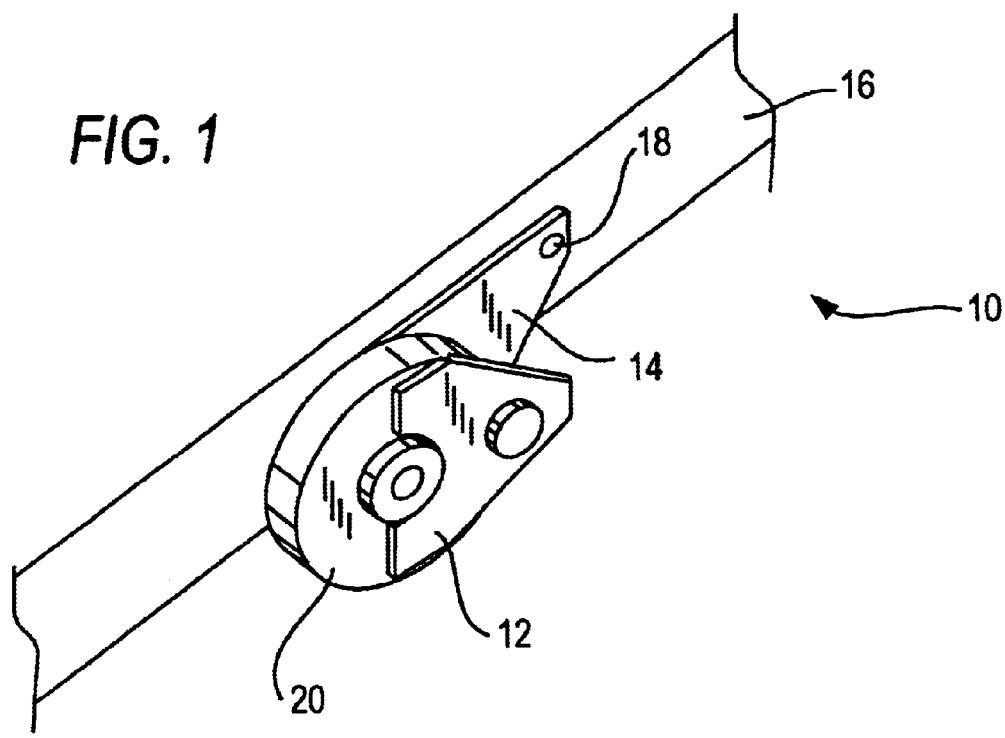
FIG. 1 is a perspective view of the invention.

With reference to FIG. 1, escalator brake assembly 10 includes brake unit 20 to apply brake torque to shaft 12 which is typically connected to a main drive shaft of the escalator. The brake's brake arm 14 is mounted to a frame or truss element 16 of the escalator and normally pivots about point 18.

When the brake is actuated against the rotating shaft 12, typically by a solenoid or otherwise as known in the art, brake torque is generated around the point 18. A torque sensing element, such as a load sensing bolt 22, mounts the brake arm 14 to the truss at location 18 and respond to the torque applied by the generation of an output signal.

Figure 2:
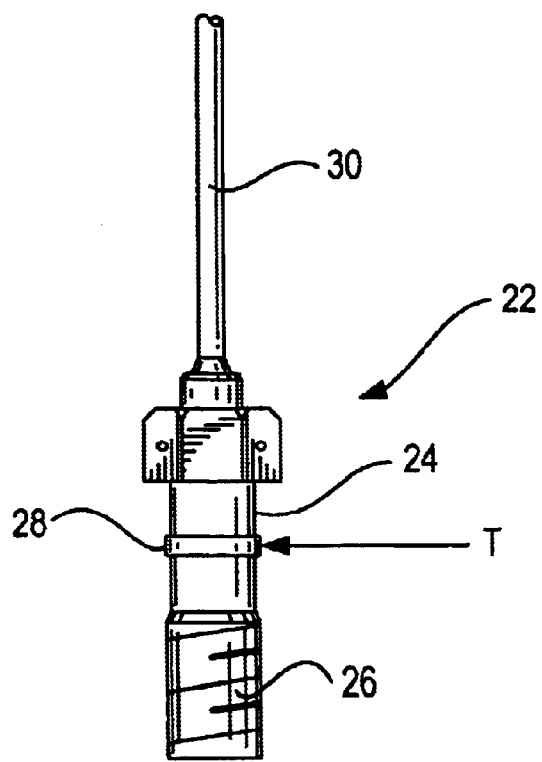
FIG. 2 is a detail representation of torque sensor that may be employed in the invention.

With further reference to FIG. 2, bolt 22 includes an internal strain gauge capable of developing an output proportional to the tension or torque T applied to the shaft portion 24 of the bolt with respect to the threaded portion 26. The threads 26 of the bolt are engaged with an appropriately threaded bore in the truss 16. A keyed portion 28 of the bolt shaft, engaging with a complementary element of the brake arm may be provided to allow the bolt to be pinned or otherwise affixed to the brake arm 14 to allow the torque to be transmitted to the bolt shaft. Alternatively, it may be possible to bush the bolt against the truss and tightened the bolt sufficiently against the brake arm such that the torque applied to the brake arm 14 is transmitted directly to the body of the bolt through the frictional contact therebetween. Torque sensing bolts of the ALD-Dynagage type may be utilized.

However mounted, the torque applied to the bolt generates an electrical the signal proportional to the torque applied. The bolt output on lead 30 thus serves as a continuous indication of the torque applied.

Figure 3:
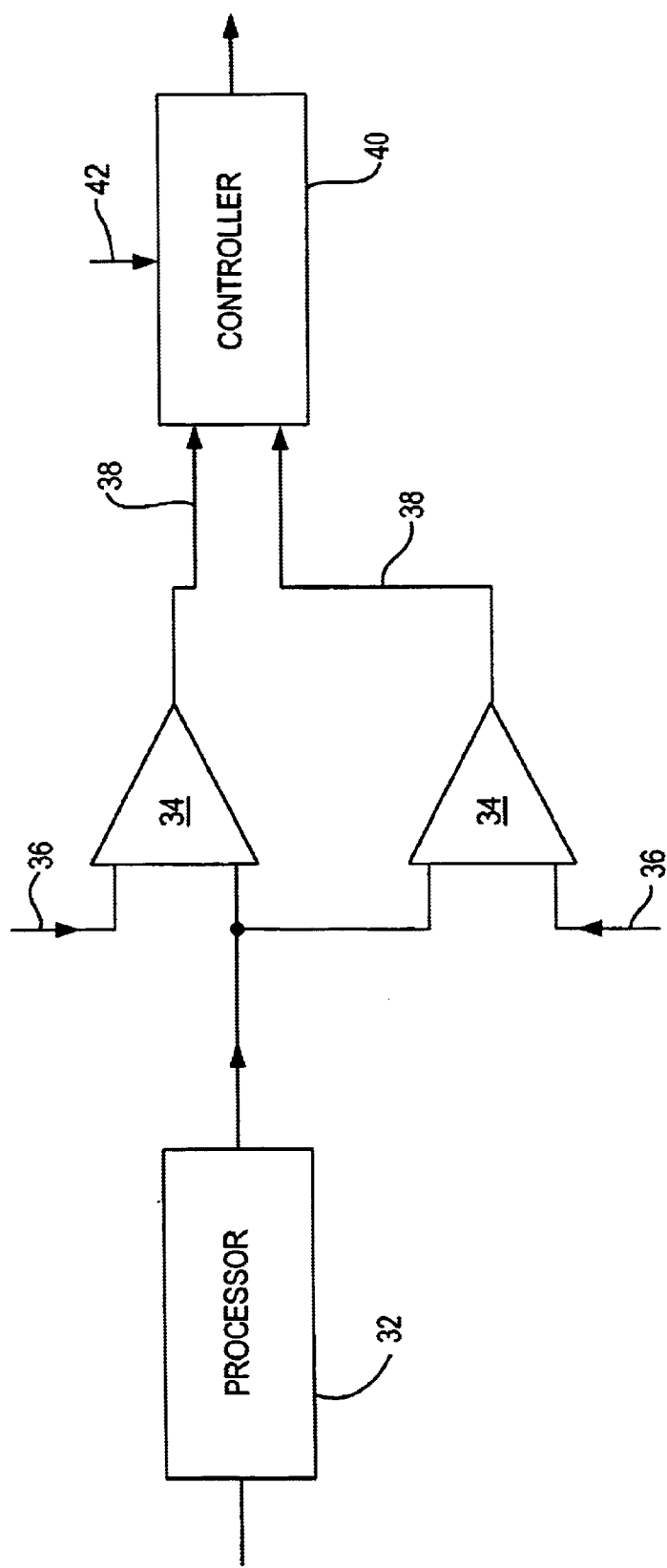
FIG. 3 is a schematic diagram of a circuit incorporating the invention.

As shown in FIG. 3, the output of the bolt 22 is first processed and conditioned by circuit 32 to provide a signal appropriate for comparison to one or more reference signals. The output of circuit 32 may be supplied to one or more comparators 34, each of which has a reference input 36 provided with an appropriate signal corresponding to designated torque or force level. When the reference level is exceeded, an output on line 38 is produced which in turn may be used as the input to a controller 40. Controller 40 may be fed with other appropriate data, such as a signal 42 to indicate that the brake has been activated such that the torque signal should be processed.

As the distance from the shaft 12 to the bolt 22 is constant, the torque levels associated with proper braking forces applied to the shaft 12 can be calculated, and corresponding bolt outputs determined. The torque can thus be monitored whenever the escalator is shut down. If, for example, a minimum torque value requirement is met, controller 40 can allow the escalator to restart. If the minimal torque is not met, an error signal can be generated and/or the escalator can remain in the shut down condition. The output of controller 40 may be utilized to perform a local action, such as escalator shut down, and/or may allow contact to a maintenance company via an electronic communication to occur.

The use of two comparators, having different torque set points, can be used to generate a secondary signal when a torque higher than the minimal torque required but still below a secondary level exists. Such a condition, which may suggest that the brake is wearing down or may soon be subject to failure, can be used to notify a maintenance company, for example, to schedule a repair of the brakes before the failure actually occurs. This can allow preventative maintenance to be scheduled at a convenient time.

We claim:

1. A method for monitoring the performance of an escalator brake, comprising the steps of:

affixing the brake to a fixed element of the escalator through a torque sensor mounted to a brake arm at a mounting point;

generating a torque sensor output proportional to torque generated by the brake during brake operation;

monitoring the output to determine whether the value exceeds at least one minimum reference value; and disabling the escalator from further operation if the value does not exceed one of the minimum values.

2. The method of claim 1, further comprising the step of:

disabling the escalator from further operation if the value does not exceed a lower minimum reference value; and generating a maintenance signal if the value does not exceed a higher minimum reference values.

3. The method according to claim 2, wherein the maintenance signal is transmitted to a maintenance company via an electronic communication.

* * * * *